United States Patent
Hanlon et al.

(10) Patent No.: US 7,185,916 B2
(45) Date of Patent: Mar. 6, 2007

(54) VEHICLE SEAT ASSEMBLY HAVING A FIELD EFFECT SENSOR FOR DETECTING SEAT POSITION

(75) Inventors: Samuel Hanlon, Livonia, MI (US); Matthew Zuzga, Macomb, MI (US)

(73) Assignee: Lear Corporation, Southfield, MI (US)

(*) Notice: Subject to any disclaimer, the term of this patent is extended or adjusted under 35 U.S.C. 154(b) by 449 days.

(21) Appl. No.: 10/756,927

(22) Filed: Jan. 14, 2004

(65) Prior Publication Data

US 2005/0151355 A1 Jul. 14, 2005

(51) Int. Cl.
*B60R 21/015* (2006.01)

(52) U.S. Cl. ..................................... 280/735

(58) Field of Classification Search .............. 280/735; 177/144; 296/65.01, 68.1, 65.13, 65.14; 701/45, 49
See application file for complete search history.

(56) References Cited

U.S. PATENT DOCUMENTS

| | | | |
|---|---|---|---|
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,594,222 A | 1/1997 | Caldwell | 200/600 |
| 5,653,462 A | 8/1997 | Breed et al. | 280/735 |
| 5,694,320 A | 12/1997 | Breed | 364/424.055 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |

(Continued)

FOREIGN PATENT DOCUMENTS

| | | |
|---|---|---|
| EP | 0 689 967 A1 | 3/1996 |
| EP | 1 270 314 A1 | 1/2003 |
| GB | 2 339 910 A | 2/2000 |
| WO | WO 98/41424 | 3/1997 |

*Primary Examiner*—Paul N. Dickson
*Assistant Examiner*—Laura B. Rosenberg
(74) *Attorney, Agent, or Firm*—Bill Panagos

(57) ABSTRACT

A vehicle seat assembly including a rail pair defining a mounting rail and a triggering rail. One of the rails is supported on a floor pan of the vehicle and the other is adapted to support a seat cushion. The rails are moveably supported relative to each other. Also, included is a field effect sensor operatively supported by the mounting rail such that the field effect sensor can be positioned in a first range of positions as well as second range of positions relative to the triggering rail. The sensor is adapted to emit an electric field and to detect disruption of the field when the field effect sensor is positioned in the first range of positions.

16 Claims, 3 Drawing Sheets

U.S. PATENT DOCUMENTS

| | | | | |
|---|---|---|---|---|
| 6,020,812 | A | 2/2000 | Thompson et al. | 340/438 |
| 6,027,138 | A | 2/2000 | Tanaka et al. | 280/735 |
| 6,030,038 | A | 2/2000 | Namba et al. | 297/257 |
| 6,039,139 | A | 3/2000 | Breed et al. | 180/271 |
| 6,043,743 | A | 3/2000 | Saito et al. | 340/562 |
| 6,045,405 | A | 4/2000 | Geltsch et al. | 439/620 |
| 6,053,529 | A * | 4/2000 | Frusti et al. | 280/735 |
| 6,056,079 | A | 5/2000 | Cech et al. | 180/273 |
| 6,059,358 | A | 5/2000 | Demick et al. | 297/188.04 |
| 6,078,854 | A | 6/2000 | Breed et al. | 701/49 |
| 6,079,763 | A | 6/2000 | Clemente | 296/65.05 |
| 6,081,757 | A | 6/2000 | Breed et al. | 701/45 |
| 6,088,640 | A | 7/2000 | Breed | 701/45 |
| 6,089,641 | A | 7/2000 | Mattarella et al. | 296/64 |
| 6,095,555 | A * | 8/2000 | Becker et al. | 280/735 |
| 6,101,436 | A | 8/2000 | Fortune et al. | 701/45 |
| 6,102,463 | A | 8/2000 | Swanson et al. | 296/37.15 |
| 6,113,139 | A * | 9/2000 | Heximer et al. | 280/735 |
| 6,116,639 | A | 9/2000 | Breed et al. | 280/735 |
| 6,129,168 | A | 10/2000 | Lotito et al. | 180/273 |
| 6,129,404 | A | 10/2000 | Mattarella et al. | 296/65.09 |
| 6,134,492 | A | 10/2000 | Breed et al. | 701/49 |
| 6,138,067 | A | 10/2000 | Cobb et al. | 701/45 |
| 6,141,432 | A | 10/2000 | Breed et al. | 382/100 |
| 6,168,198 | B1 | 1/2001 | Breed et al. | 280/735 |
| 6,186,537 | B1 | 2/2001 | Breed et al. | 280/735 |
| 6,220,627 | B1 | 4/2001 | Stanley | 280/735 |
| 6,234,519 | B1 | 5/2001 | Breed | 280/735 |
| 6,234,520 | B1 | 5/2001 | Breed et al. | 280/735 |
| 6,242,701 | B1 | 6/2001 | Breed et al. | 177/144 |
| 6,250,671 | B1 | 6/2001 | Osmer et al. | 280/735 |
| 6,250,672 | B1 | 6/2001 | Ryan et al. | 280/735 |
| 6,253,134 | B1 | 6/2001 | Breed et al. | 701/49 |
| RE37,260 | E | 7/2001 | Varga et al. | 367/99 |
| 6,254,127 | B1 | 7/2001 | Breed et al. | 280/735 |
| 6,270,116 | B1 | 8/2001 | Breed et al. | 280/735 |
| 6,275,026 | B1 * | 8/2001 | Becker | 324/207.2 |
| 6,279,946 | B1 | 8/2001 | Johnson et al. | 280/734 |
| 6,283,503 | B1 | 9/2001 | Breed et al. | 280/735 |
| 6,323,444 | B1 | 11/2001 | Aoki | 177/144 |
| 6,324,453 | B1 | 11/2001 | Breed et al. | 701/45 |
| RE37,466 | E * | 12/2001 | Allen et al. | 280/735 |
| 6,325,414 | B2 | 12/2001 | Breed et al. | 280/735 |
| 6,330,501 | B1 | 12/2001 | Breed et al. | 701/49 |
| 6,342,683 | B1 | 1/2002 | Aoki et al. | 177/144 |
| 6,351,994 | B1 * | 3/2002 | Pinkos et al. | 73/432.1 |
| 6,353,394 | B1 | 3/2002 | Maeda et al. | 340/667 |
| 6,393,133 | B1 | 5/2002 | Breed et al. | 382/100 |
| 6,394,490 | B2 | 5/2002 | Osmer et al. | 280/735 |
| 6,397,136 | B1 | 5/2002 | Breed et al. | 701/45 |
| 6,407,347 | B1 | 6/2002 | Blakesley | 177/144 |
| 6,412,813 | B1 | 7/2002 | Breed et al. | 280/735 |
| 6,416,080 | B1 | 7/2002 | Gillis et al. | 280/735 |
| 6,422,595 | B1 | 7/2002 | Breed et al. | 280/735 |
| 6,442,465 | B2 | 8/2002 | Breed et al. | 701/45 |
| 6,442,504 | B1 | 8/2002 | Breed et al. | 702/173 |
| 6,445,988 | B1 | 9/2002 | Breed et al. | 701/45 |
| 6,452,870 | B1 | 9/2002 | Breed et al. | 367/99 |
| 6,457,545 | B1 | 10/2002 | Michaud et al. | 180/272 |
| 6,466,849 | B2 * | 10/2002 | Kamiji et al. | 701/45 |
| 6,474,739 | B1 | 11/2002 | Lagerweij | 297/341 |
| 6,476,514 | B1 | 11/2002 | Schondorf | 307/10.1 |
| 6,506,069 | B2 | 1/2003 | Babala et al. | 439/248 |
| 6,605,877 | B1 | 8/2003 | Patterson et al. | 307/10.1 |
| 6,609,054 | B2 | 8/2003 | Wallace | 701/45 |
| 6,612,614 | B2 * | 9/2003 | Wolfe | 280/735 |
| 6,683,544 | B2 * | 1/2004 | Tokunaga et al. | 341/15 |
| 6,854,782 | B2 * | 2/2005 | Reichert et al. | 296/65.13 |
| 6,935,692 | B2 * | 8/2005 | Nishide et al. | 297/344.11 |
| 7,005,848 | B2 * | 2/2006 | Suzuki et al. | 324/207.26 |
| 2002/0003345 | A1 | 1/2002 | Stanley et al. | 280/735 |
| 2002/0056975 | A1 | 5/2002 | Yoon et al. | 280/735 |
| 2002/0079728 | A1 | 6/2002 | Tame | 297/344.1 |
| 2002/0098730 | A1 | 7/2002 | Babala et al. | 439/248 |
| 2002/0195807 | A1 | 12/2002 | Ishida | 280/735 |
| 2003/0040858 | A1 | 2/2003 | Wallace | 701/45 |
| 2003/0071479 | A1 | 4/2003 | Schaller et al. | 296/136 |
| 2003/0090133 | A1 | 5/2003 | Nathan et al. | 297/217.3 |
| 2003/0106723 | A1 | 6/2003 | Thakur et al. | 177/144 |
| 2003/0111276 | A1 | 6/2003 | Kajiyama | 177/144 |
| 2003/0164715 | A1 | 9/2003 | Lester | 324/661 |
| 2003/0171036 | A1 | 9/2003 | Aujla et al. | 439/660 |
| 2003/0189362 | A1 | 10/2003 | Lichtinger et al. | 297/217.3 |
| 2004/0004474 | A1 * | 1/2004 | Kojima et al. | 324/207.24 |
| 2004/0100388 | A1 * | 5/2004 | Yoshida et al. | 340/686.1 |
| 2004/0239086 | A1 * | 12/2004 | Ventura et al. | 280/735 |
| 2005/0057065 | A1 * | 3/2005 | Endoh et al. | 296/65.13 |

* cited by examiner

VEHICLE SEAT ASSEMBLY HAVING A FIELD EFFECT SENSOR FOR DETECTING SEAT POSITION

BACKGROUND OF THE INVENTION

1. Field of the Invention

The present invention relates generally to a vehicle seat assembly, and more particularly to a vehicle seat assembly having a field effect sensor for detecting the position of the vehicle seat assembly.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt extending diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle.

Vehicle seats are typically linearly adjustable toward and away from the dashboard. Originally, the primary and supplemental restraint systems were designed to operate in the same manner during a vehicular collision regardless of the linear seat position relative to the dashboard. For example, some airbag systems deploy with the same speed and force regardless of the seat position. However, in some instances, the speed and force of the deploying airbag is too great for persons sitting close to the dashboard, and injury can result.

Partially in response to this need, vehicle safety systems have been proposed with a means of detecting the seat position and communicating the detected position to a controller that controls the primary and/or supplemental restraint systems accordingly. Many of these systems incorporate a Hall effect sensor and a magnet emitting a magnetic field. Generally speaking, the Hall effect sensor of these systems detects changes in magnetic flux caused when the seat moves and the system correlates this change to a certain seat position. One such safety system is disclosed in U.S. Pat. No. 6,095,555 to Becker et al. In the Becker et al. system, a Hall effect sensor and a magnet are fixed to a vehicle interior, adjacent a vehicle seat. Movement of the vehicle seat past a predetermined forward position causes a portion of the seat to enter the magnetic field created by the magnet, thereby changing the magnetic flux. Upon detecting this change, the Hall effect sensor sends a signal to a controller, which alters or prevents the actuation of a restraint device. More specifically, the device disclosed in the Becker et al. '555 patent can be used to prevent an airbag from deploying or can suppress the inflation of an airbag if the device detects that the seat is less than a minimum distance from the stowed airbag and injury might otherwise occur to the occupant.

While the Becker et al. and similar Hall effect systems can alter or prevent actuation of a vehicle restraint system depending on seat position, there remain certain drawbacks associated with these systems. Particularly, relative positioning between the Hall effect sensor and the magnet in these systems is especially important, typically requiring assembly within tight tolerances, and this can increase manufacturing time. Also, these seat positioning detection systems can be designed for a vehicle with one set of interior dimensions, but incorporating that same system into a different vehicle with different interior dimensions will usually require a time consuming and costly re-design of the system. This is because the relative positioning between the Hall effect sensor and the magnet will likely have to be re-designed according to the different interior dimensions, such as different distances between the seat and the steering wheel, dashboard, etc.

Therefore, there is an ongoing need in the art for a vehicle seat assembly that has a seat position detecting system that can be more easily assembled and that can be more easily adapted for vehicles with differing interior dimensions.

SUMMARY OF THE INVENTION

Accordingly, the present invention is a vehicle seat assembly for a vehicle. The vehicle seat assembly includes a rail pair defining a mounting rail and a triggering rail. One of the mounting rail and the triggering rail is supported on a floor pan of the vehicle and the other of the mounting rail and the triggering rail is adapted to support a seat cushion. The mounting rail and the triggering rail are moveably supported relative to each other. Also, the vehicle seat assembly includes a field effect sensor. The field effect sensor is operatively supported by the mounting rail such that the field effect sensor can be positioned in a first range of positions as well as a second range of positions relative to the triggering rail. The field effect sensor is adapted to emit an electric field and to detect disruption of the electric field. The field effect sensor detects disruption of the electric field when the field effect sensor is positioned in the first range of positions.

The field effect sensor can be positioned relative to the triggering rail within looser tolerances as compared to sensors of the prior art, such as Hall effect sensors. Thus, because of these looser tolerances, assembly of the vehicle seat assembly becomes easier. Also, the position of the field effect sensor with respect to the triggering rail can be adjusted in several convenient ways. As such, the vehicle seat assembly provides seat position detection capability for different vehicle production lines at reduced cost.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
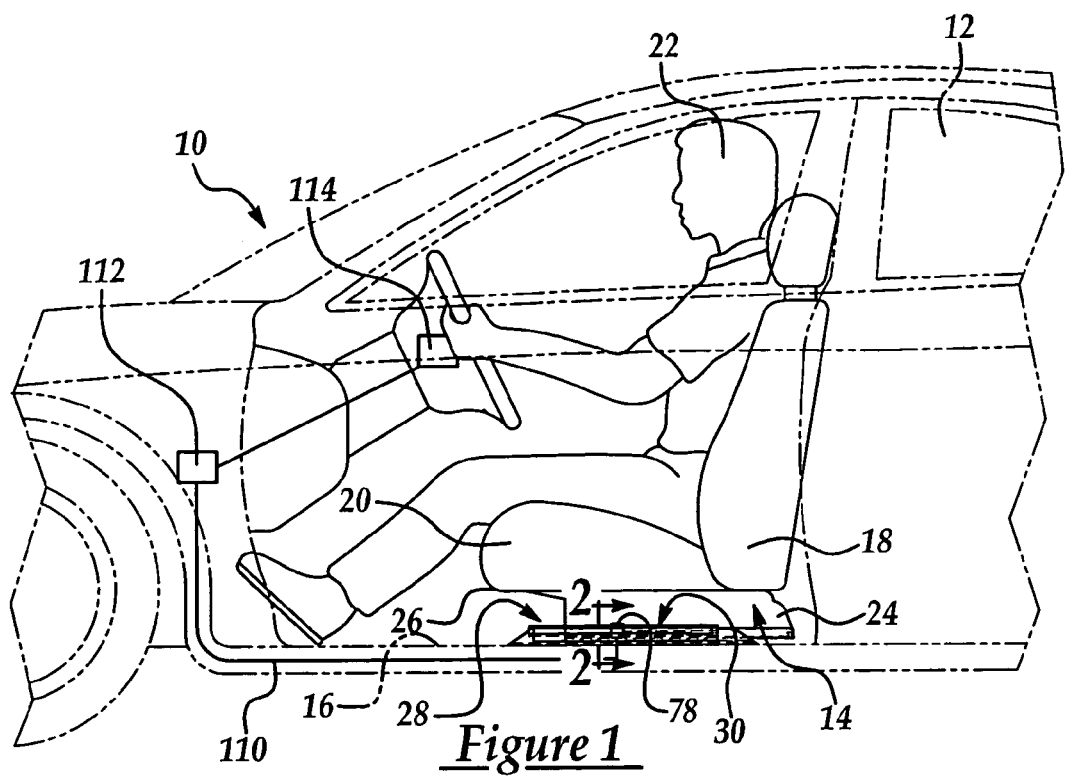
FIG. 1 is a side view of a partial vehicle interior with a vehicle seat assembly of the present invention having a seat position detection device.

Referring now to the drawings, where like numerals are used to designate like structure throughout the figures, a vehicle is generally indicated at 10 in FIG. 1. One embodiment of a vehicle seat assembly, generally indicated at 14, is shown in an interior 12 of the vehicle 10. The vehicle seat assembly 14 is adapted to be supported upon a floor pan 16 of a vehicle, such as a car or truck. Certain aspects of a known and generally constructed vehicle seat assembly 14 are described in detail below. However, those having ordinary skill in the art will appreciate that the vehicle seat assembly 14 illustrated in the drawings is merely one example of suitable structure to which the novel aspect of the vehicle seat assembly 14 may be applied.

The vehicle seat assembly 14 includes a seat cushion 20 and a seat back 18 operatively supported relative to the seat cushion 20 in a conventional manner. The seat back 18 and seat cushion 20 are both adapted to support an occupant 22 within the interior 12 of the vehicle 10. The vehicle seat assembly 14 also includes at least one seat riser 24 mounted to a bottom end 26 of the seat cushion 20.

Figure 5:
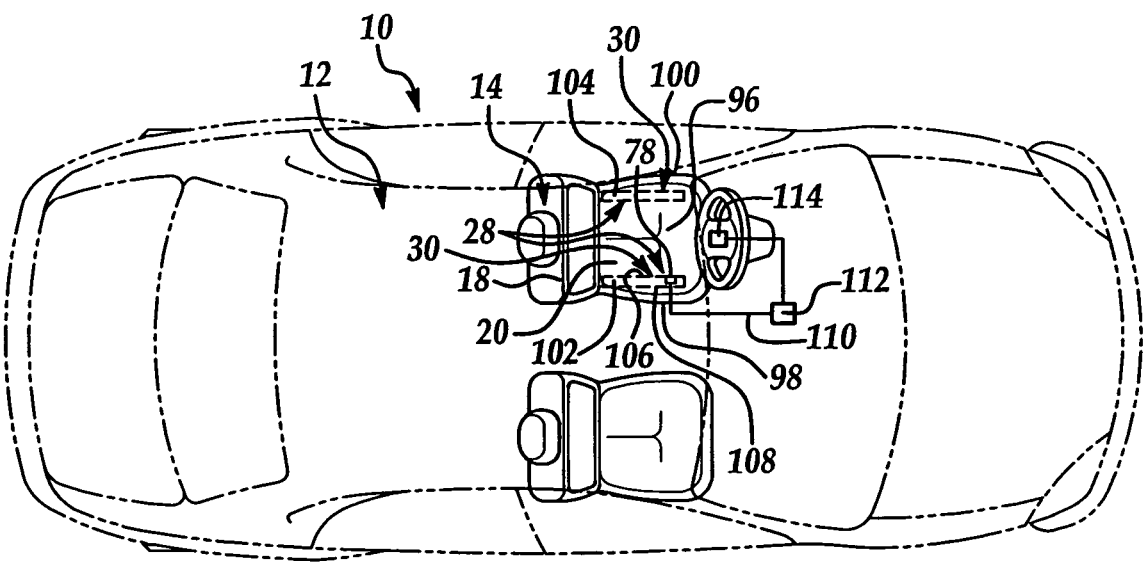
FIG. 5 is a top view of a partial vehicle interior with the vehicle seat assembly of the present invention.

As shown in FIGS. 1 and 5, the vehicle seat assembly 14 also includes a plurality of rails, generally indicated at 28. The rails 28 are arranged into rail pairs, generally indicated at 30. As shown in FIG. 5, there are two rail pairs 30 in spaced relationship supporting the seat cushion 20. The rail pairs 30 couple the seat cushion 20 to the floor pan 16 and allow the seat cushion 20 to move within the interior 12 of the vehicle 10 as will be described in greater detail below.

Figure 2:
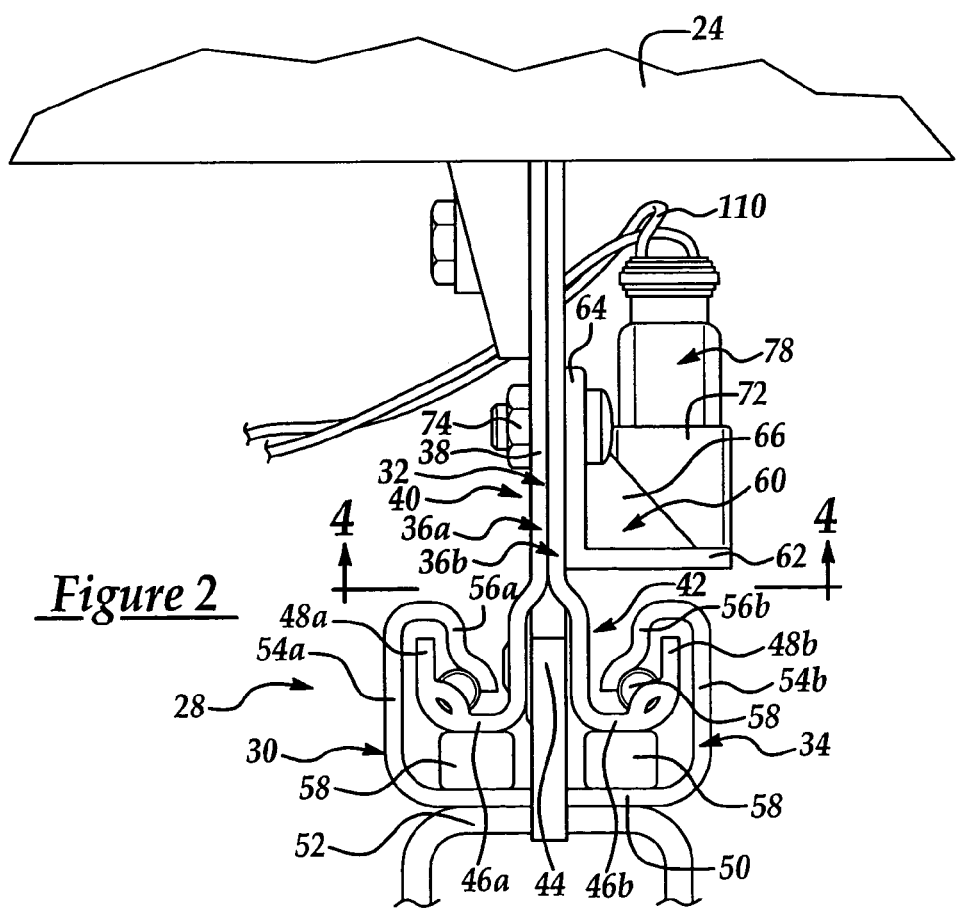
FIG. 2 is a sectional view of a rail pair employed in the vehicle seat assembly taken along the line 2—2 of FIG. 1.

As shown in FIG. 2, the rail pair 30 defines a mounting rail generally indicated at 32 and a triggering rail generally indicated at 34. One of the mounting rail 32 and the triggering rail 34 is supported on the floor pan 16 of the vehicle 10, and the other of the mounting rail 32 and the triggering rail 34 is adapted to support the seat riser 24 to thereby support the seat cushion 20. For instance, in the embodiment shown, the triggering rail 34 is fixedly attached to the floor pan 16 by rivets, welds, bolts, or other fasteners (not shown), and the mounting rail 32 is fixedly attached to the seat riser 24 by rivets, welds, bolts or other fasteners. In another embodiment, the triggering rail 34 may be attached to the seat riser 24 and the mounting rail 32 is attached to the floor pan 16.

The mounting rail 32 is an elongate member made out of two mirror-image bent metal plates generally indicated at 36a, 36b, that are attached in a known manner. A vertical ridge 38 extends along the length of an upper portion 40 of the mounting rail 32. The vertical ridge 38 of the mounting rail 32 supports the seat riser 24 and thus the seat cushion 20. Along a lower portion 42 of the mounting rail 32, both plates 36a, 36b are bent outward away from each other to define a space 44. Further downward, the plates 36a, 36b are bent horizontally away from each other so as to define horizontal bearing members 46a, 46b. The terminal end of both plates 36a, 36b is bent upward vertically so as to define vertical bearing members 48a, 48b.

Furthermore, the triggering rail 34 is an elongate member made out of metal plate that is longitudinally bent so as to have a generally U-shaped cross section. More specifically, the triggering rail 34 includes a horizontal base 50. The base 50 is attached to the floor pan 16 of the vehicle, either directly or via brackets 52. The triggering rail 34 is bent upward at opposing sides of the base 50 so as to define two side members 54a, 54b that extend vertically from the base 50. The side members 54a, 54b are bent inward toward each other and generally downward toward the base 50 so as to define bearing members 56a, 56b.

Figure 3A:
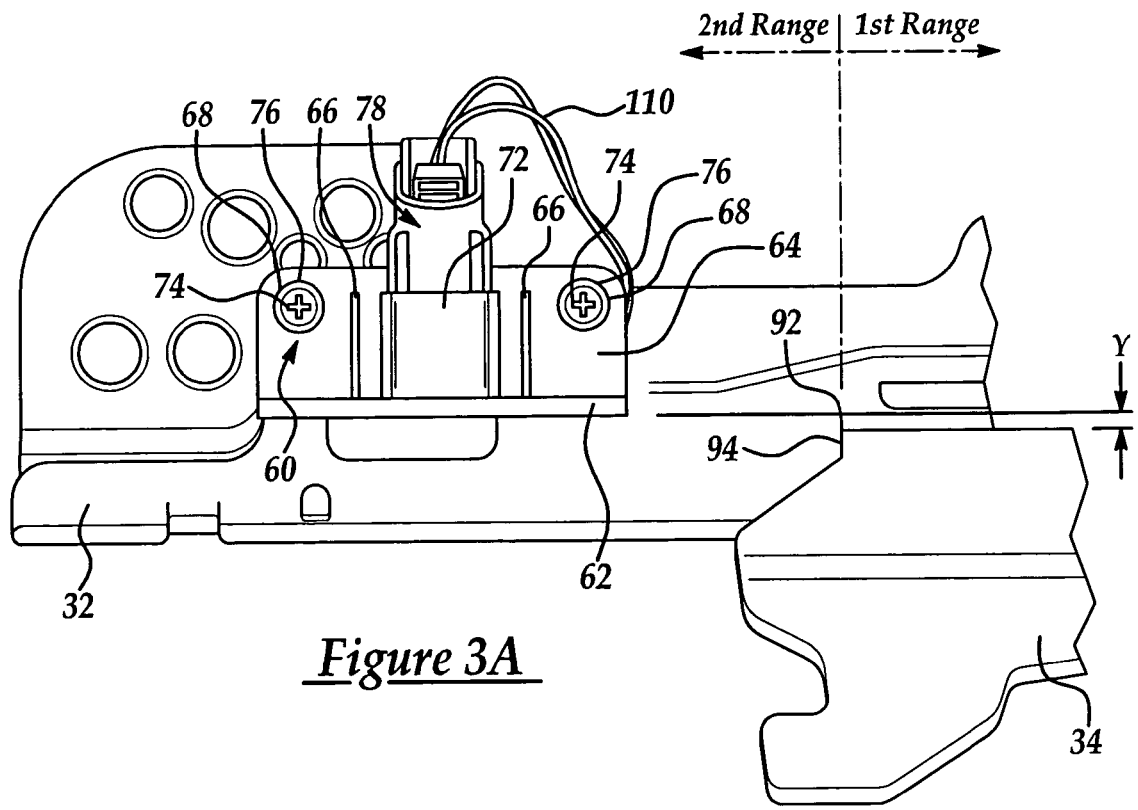
FIG. 3A is a side detail view the rail pair shown in a forward position.
Figure 3B:
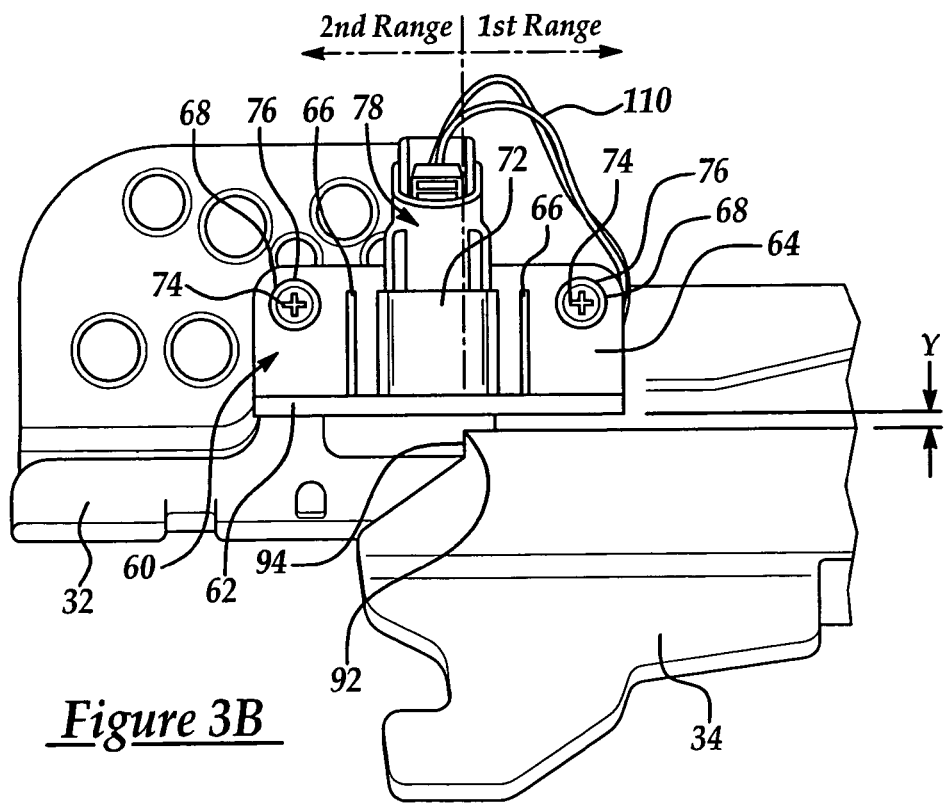
FIG. 3B is a side detail view of the rail pair shown in a rearward position.

As shown in FIGS. 2, 3A, and 3B, the mounting rail 32 is inserted longitudinally within the triggering rail 34 such that the side members 54a, 54b of the triggering rail 34 extend over and partially around the horizontal bearing members 46a, 46b and vertical bearing members 48a, 48b of the mounting rail 32. The mounting rail 32 and the triggering rail 34 are moveably supported relative to each other and in the embodiment shown, a plurality of longitudinally spaced bearings 58 are positioned between the rails 32, 34, above the base 50 of the triggering rail 34 and below the horizontal bearing members 46a, 46b of the mounting rails 32. Also, a plurality of longitudinally spaced bearings 58 is positioned between the rails 32, 34, below the bearing members 56a, 56b of the triggering rail 34 and above the horizontal bearing members 46a, 46b of the mounting rail 32. The bearings 58 are adapted to allow the mounting rail 32 to move in a rectilinear direction relative to the triggering rail 34 to thereby allow movement of the seat cushion 20 within the interior 12 of the vehicle 10.

The vehicle seat assembly 14 also includes a mounting bracket, generally indicated at 60. In the embodiment shown, the mounting bracket 60 is substantially L-shaped with a first planar member 62 and a second planar member 64 extending at a 90° angle therefrom. A plurality of triangular ribs 66 extends between the first planar member 62 and second planar member 64 to thereby reinforce the attachment between the first planar member 62 and the second planar member 64. Also, two apertures 68 extend through opposing corners of the second planar member 64. The first planar member 62 defines a first surface 70 on a side opposite to that of the second planar member 64. Furthermore, a hollow tube 72 extends upward from a side of the first planer member 62 opposite to that of the first surface 70.

The mounting bracket 60 is adapted to be operatively supported by the mounting rail 32. In the embodiment shown, a fastener 74 extends through one of the two apertures 68 of the mounting bracket 60 and through corresponding apertures 76 formed in the mounting rail 32 such that the mounting bracket 60 is fixedly attached to the mounting rail 32. Preferably, the mounting bracket 60 is attached to the mounting rail 32 such that the first surface 70 of the mounting bracket 32 can move directly over one of the side members 54a, 54b of the triggering rail 34.

As shown best in FIGS. 2, 3A, 3B, and 4, the vehicle seat assembly 14 further includes a field effect sensor, generally indicated at 78. The field effect sensor 78 is one of a type known in the art adapted to emit an electric field and to detect disruption of that electric field. As will be described in greater detail below, by emitting and detecting the disruption of this electric field, the field effect sensor 78 allows detection of the position of the vehicle seat assembly 14.

Figure 4:
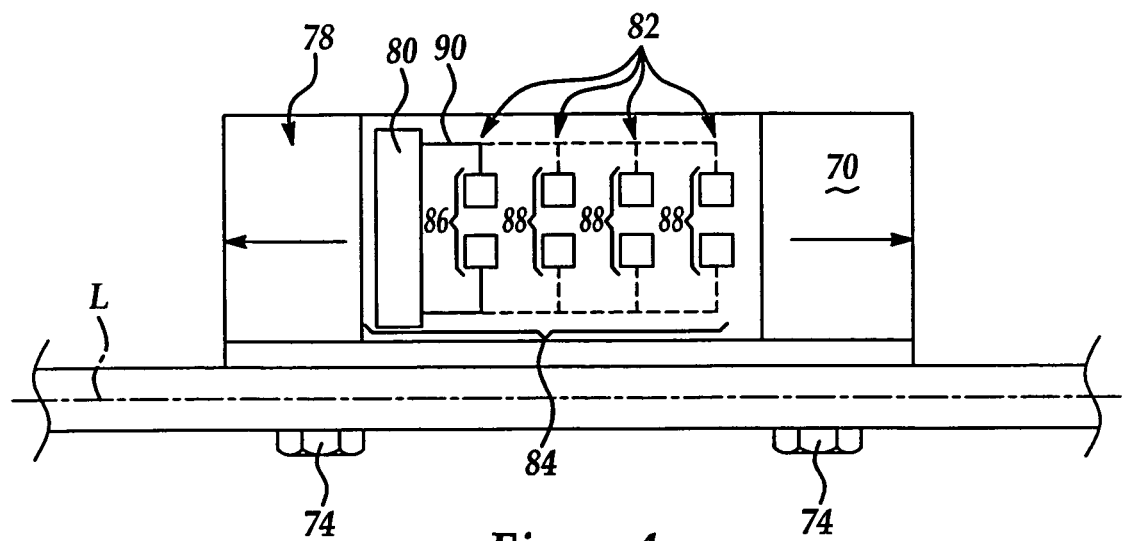
FIG. 4 is a schematic bottom view of a field effect sensor and mounting bracket employed in vehicle seat assembly of the present invention.

In one embodiment shown in FIG. 4, the field effect sensor 78 has a logic device 80 and a plurality of electrode pairs, generally indicated at 82. The logic device 80 and the electrode pairs 82 are located within a sensing area 84 of the field effect sensor 78. The electrode pairs 82 include an active pair 86 and at least one inactive pair 88, and the active pair 86 is the only electrode pair 82 in communication with the logic device 80. For example, the field effect sensor 78 shown includes four electrode pairs 82, and only the leftmost electrode pair—the active pair 86—is in communication with the logic device 80 via wires 90. The four electrode pairs 82 are aligned parallel to a longitudinal axis of the triggering rail 32, represented in FIG. 4 by axis L. As will be described in greater detail below, having a plurality of electrode pairs 82 aligned parallel to the axis L of the triggering rail 34 provides a more adjustable field effect sensor 78.

When activated, one electrode of the active pair 86 is positively charged while the other electrode is negatively charged such that the active pair 86 emits an electric field. When a conductive object moves near the active pair 86 and consequently disrupts the electric field emitted therefrom, the logic device 80 detects this disruption, and this allows detection of the position of the vehicle seat assembly 14 as discussed below.

The mounting bracket 60 is adapted to operatively support the field effect sensor 78 relative to the first surface 70. In one embodiment, the field effect sensor 78 is molded to the mounting bracket 60 such that the sensing area 84 is spaced just off the first surface 70. Also, the mounting bracket 60 is attached to the mounting rail 32 such that the field effect sensor 78 can be positioned in a first range of positions as well as a second range of positions relative to the triggering rail 34. More specifically, as shown in FIGS. 3A and 3B, the triggering rail 34 defines a trigger point 92, and in the embodiment shown, the trigger point 92 is located at a forward terminal end 94 of the triggering rail 34. The mounting bracket 60 is attached to the mounting rail 32 such that the field effect sensor 78 can be positioned ahead the trigger point 92 (FIG. 3A) and behind the trigger point 92 (FIG. 3B). When the mounting rail 32 slides on the triggering rail 34 such that the field effect sensor 78 is behind the trigger point 92, the field effect sensor 78 is said to be in the first range of positions. Conversely, when the mounting rail 32 slides on the triggering rail 34 such that the field effect sensor 78 is ahead of the trigger point 92, the field effect sensor 78 is said to be in the second range of positions. As such, the trigger point 92 defines the first range of positions and the second range of positions. It should be appreciated that although FIG. 3B shows the field effect sensor 78 only slightly behind the trigger point 92, and thus only slightly in the first range of positions, the mounting rail 32 can slide on the triggering rail 34 such that the field effect sensor 78 moves substantially within the first range of positions. In the preferred embodiment, the mounting bracket 60 is attached to the mounting rail 32 such that the four electrode pairs 82 are aligned parallel to a longitudinal axis of the triggering rail 32, represented in FIG. 4 by axis L. As will be described in greater detail below, having a plurality of electrode pairs 82 aligned parallel to the axis L of the triggering rail 34 provides a more adjustable field effect sensor 78.

As stated above, the field effect sensor 78 emits an electric field and can detect a disruption of that electric field. When the mounting rail 32 is positioned such that the field effect sensor 78 is positioned away from the triggering rail 34, such as when the field effect sensor 78 is positioned in the second range of positions, the electric field remains relatively constant, and the field effect sensor 78 does not detect a disruption of the electric field. However, when the mounting rail 32 is positioned such that the field effect sensor 78 is positioned near the triggering rail 34, such as when the field effect sensor is positioned in the first range of positions, the close proximity between the active pair 86 of the field effect sensor 78 and the conductive material of the triggering rail 34 causes a disruption of the electric field, and the field effect sensor 78 detects the disruption of the electric field, to thereby detect position of the vehicle seat assembly 14 as discussed in great detail below.

In the preferred embodiment of the vehicle seat assembly 14, the field effect sensor 78 is positioned such that conductive objects other than the triggering rail 32 are less likely to disrupt the electrical field emitted by the field effect sensor 78. As shown in FIG. 5, the seat cushion 20 defines a middle 96, an inboard side 98, and an outboard side 100. The seat cushion 20 is supported by rail pairs 30, specifically an inboard rail pair 102 and an outboard rail pair 104, both shown in phantom. The inboard rail pair 102 supports the seat cushion 20 adjacent the inboard side 98 of the seat cushion 20, and the outboard rail pair 104 supports the seat cushion 20 adjacent the outboard side 100 of the seat cushion 20. The mounting rail 32 is included in the inboard rail pair 102 such that the field effect sensor 78 is further away from the exterior of the vehicle 10, a likely source of foreign objects that could cause unintended disruption of the electric field. Moreover, the mounting rail 32 defines a first side 106 located adjacent the middle 96 of the seat cushion 20 and a second side 108 located adjacent the inboard side 98 of the seat cushion 20. As shown, the field effect sensor 78 is supported by the mounting rail 32 on the first side 106 such that seat cushion 20, and the inboard and outboard rail pairs 102, 104 collectively surround the field effect sensor 78 and partially block foreign objects that could otherwise cause unintended disruption of the electric field. Furthermore, the ribs 66 of the mounting bracket 60 are preferably shaped and positioned so as to inhibit foreign objects from moving into close proximity with the field effect sensor 78 and causing unintended disruption of the electric field.

In the preferred embodiment, the logic device 80 of the field effect sensor 78 is adapted to generate a first signal when the field effect sensor 78 is positioned in the first range of positions, and to generate a second signal when the field effect sensor 78 is positioned in the second range of positions. In other words, when the vehicle seat assembly 14 is in the rearward position and the field effect sensor 78 is consequently behind the trigger point 92 of the triggering rail 34, the electric field emitted by the field effect sensor 78 is disrupted due to the close proximity of the triggering rail 34. In this case, the logic device 80 generates a first signal. In contrast, when the vehicle seat assembly 14 is in the forward position and the field effect sensor 78 is consequently ahead of the trigger point 92 of the triggering rail 34, the distance between the field effect sensor 78 and the triggering rail 34 allows the electric field emitted by the field effect sensor 78 to remain relatively constant. In this case, the logic device 80 generates the second signal. Obviously, the first signal is different from the second signal such that the forward and rearward positions can be differentiated.

In the embodiment shown in FIGS. 1 and 5, the logic device 80 of the field effect sensor 78 is in electrical communication via wires 110 with a controller 112. The controller 112 is adapted to receive the first and second signals generated by the logic device 80. The controller 112 can use these signals as data for controlling the vehicle 10 in any number of ways. For instance, in the embodiment shown in FIGS. 1 and 5, the controller 112 is in communication with a restraint system 114. The controller 112 controls the restraint system 114 in a first manner when the first signal is received by the controller 112, and the controller 112 controls the restraint system 114 in a second manner when the second signal is received by the controller 112. By way of example, in one embodiment, the restraint system 114 is an airbag stowed in the steering wheel of the vehicle 10. The controller 112 allows regular inflation of the airbag when the controller 112 receives the first signal from the field effect sensor 78 since the vehicle seat assembly 14 is distanced from the deploying airbag, and the occupant 22 is less likely to be injured by the deploying airbag. In contrast, the controller 112 prevents or suppresses regular inflation of the airbag when the controller 112 receives the second signal from the field effect sensor 78 since the vehicle seat assembly 14 is close to the deploying airbag, and the occupant could be injured by the deploying airbag. Preferably, the relative positioning between the field effect sensor 78 and the trigger point 92 is predetermined such that the controller 112 controls the restraint system 114 in a manner that enhances the safety of the occupant.

It is noted that the vertical distance between the field effect sensor 78 and the trigger point 92 is important because the field effect sensor 78 should be close enough such that the triggering rail 34 can disrupt the electric field emitted from the field effect sensor 78. (This vertical distance dimension is represented in FIGS. 3A and 3B by the dimension Y.) However, the field effect sensor 78 can be vertically positioned relative to the trigger point 92 within looser tolerances as compared to sensors of the prior art, such as Hall effect sensors. Thus, because of these looser tolerances, assembly of the vehicle seat assembly 14 becomes easier.

Also, the vehicle seat assembly 14 of the present invention can be easily adapted to adjust the relative positioning between the field effect sensor 78 and trigger point 92. Obviously, the mounting bracket 60 can be shifted axially on the mounting rail 32 in order to change the relative positioning between the field effect sensor 78 and the trigger point 92. However, this relative positioning can also be changed without shifting the mounting bracket 60 axially on the mounting rail 32. For instance, in one embodiment, the wires 90 extending from the logic device 80 of the field effect sensor 78 are changed from one electrode pair 82 to another electrode pair 82 such that the active pair 86 is moved axially with respect to the triggering point 92. (The changeable wiring configuration is represented in phantom in FIG. 4.) In a second embodiment, the sensing area 84 of the field effect sensor 78 is shifted axially along the first surface 70 of the mounting bracket 60 such that the active pair 86 is moved axially with respect to the triggering point 92. Specifically, in this second embodiment, the length of the sensing area 84 of the field effect sensor 78 is approximately fifty millimeters (50 mm) smaller than the length of the first surface 70, thereby allowing for substantial axial adjustment of the sensing area 84 along the first surface 70.

Because the relative positioning between the field effect sensor 78 and the triggering point 92 is easily adjustable, the vehicle seat assembly 14 of the present invention can be more easily incorporated into a variety of vehicle production lines, regardless of the differences in interior dimensions of the different lines, and this can create cost savings. For instance, different production lines often incorporate common rail pairs 30, and the mounting bracket 60 is attached at the same location on each mounting rail 32 to thereby reduce costs. As such, assuming the different vehicle production lines have different interior dimensions, the relative positioning between the mounting bracket 60 and the triggering point 92 will be different among the different production lines. However, because the sensing area 84 can be shifted along the first surface 70, the wiring between the logic device 80 and the designated active electrode pair 86 can be changed, or both, the vehicle seat assembly 14 of the present invention can be incorporated into many of these vehicle production lines without having to change the position of the mounting bracket 60 on the mounting rail 32. Thus, the vehicle seat assembly 14 provides seat position detection capability for different vehicle production lines at reduced cost.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle seat assembly adapted to be supported on a floor pan of a vehicle, said assembly comprising:
   a plurality of rails arranged into rail pairs, wherein at least one rail pair defines a mounting rail and a triggering rail, wherein one of said mounting rail and said triggering rail is supported on the floor pan of the vehicle and the other of said mounting rail and said triggering rail is adapted to support a seat cushion, and wherein said mounting rail and said triggering rail are moveably supported relative to each other; and
   a field effect sensor operatively supported by said mounting rail such that said field effect sensor can be positioned in a first range of positions as well as a second range of positions relative to the triggering rail;
   a mounting bracket with a first surface, said mounting bracket adapted to operatively support said field effect sensor relative to said surface, said mounting bracket also adapted to be operatively supported by said mounting rail; and
   said field effect sensor defining a sensing area which is smaller than said first surface of said mounting bracket, said field effect sensor adapted to emit an electric field and to detect disruption of said electric field, wherein said field effect sensor detects disruption of said electric field when said field effect sensor is positioned in said first range of positions.

2. A vehicle seat assembly as set forth in claim 1, wherein said triggering rail defines a trigger point which defines said first range of positions and said second range of positions.

3. A vehicle seat assembly as set forth in claim 2, wherein said trigger point is located at a terminal end of said triggering rail.

4. A vehicle seat assembly as set forth in claim 1, wherein said field effect sensor is in electrical communication with a controller and is adapted to generate a first signal received by said controller when said field effect sensor is positioned in said first range of positions, and wherein said field effect sensor is adapted to generate a second signal received by said controller when said field effect sensor is positioned in said second range of positions, wherein said controller controls a restraint system in a first manner when said first signal is received by said controller, and wherein said controller controls said restraint system in a second manner when said second signal is received by said controller.

5. A vehicle seat assembly as set forth in claim 1, wherein said field effect sensor is molded to said mounting bracket.

6. A vehicle seat assembly as set forth in claim 1, wherein said field effect sensor comprises a logic device and a plurality of electrode pairs, said electrode pairs including an active pair and at least one inactive pair, wherein said active pair is the only electrode pair in communication with said logic device.

7. A vehicle seat assembly as set forth in claim 6, wherein said electrode pairs are aligned parallel to a longitudinal axis of said triggering rail.

8. A vehicle seat assembly as set forth in claim 1, wherein the seat cushion defines a middle and a side, and wherein said mounting rail defines a first side located adjacent the middle and a second side located adjacent the side, and wherein said field effect sensor is supported by said mounting rail on said first side.

9. A vehicle seat assembly adapted to be supported on a floor pan of a vehicle, said assembly comprising:
 a seat cushion;
 a seat back operatively supported relative to said seat cushion;
 a plurality of rails arranged into rail pairs, wherein at least one rail pair defines a mounting rail and a triggering rail, wherein one of said mounting rail and said triggering rail is supported on the floor pan of the vehicle and the other of said mounting rail and said triggering rail is adapted to support said seat cushion, and wherein said mounting rail and said triggering rail are moveably supported relative to each other to thereby allow movement of said seat cushion within the vehicle; and
 a field effect sensor operatively supported by said mounting rail such that said field effect sensor can be positioned in a first range of positions as well as a second range of positions relative to the triggering rail;
 a mounting bracket with a first surface, said mounting bracket adapted to operatively support said field effect sensor relative to said surface, said mounting bracket also adapted to be operatively supported by said mounting rail; and
 said field effect sensor defining a sensing area which is smaller than said first surface of said mounting bracket, said field effect sensor adapted to emit an electric field and to detect disruption of said electric field, wherein said field effect sensor detects disruption of said electric field when said field effect sensor is positioned in said first range of positions.

10. A vehicle seat assembly as set forth in claim 9, wherein said triggering rail defines a trigger point which defines said first range of positions and said second range of positions.

11. A vehicle seat assembly as set forth in claim 10, wherein said trigger point is located at a terminal end of said triggering rail.

12. A vehicle seat assembly as set forth in claim 9, wherein said field effect sensor is in electrical communication with a controller and is adapted to generate a first signal received by said controller when said field effect sensor is positioned in said first range of positions, and wherein said field effect sensor is adapted to generate a second signal received by said controller when said field effect sensor is positioned in said second range of positions, wherein said controller controls a restraint system in a first manner when said first signal is received by said controller, and wherein said controller controls said restraint system in a second manner when said second signal is received by said controller.

13. A vehicle seat assembly as set forth in claim 9, wherein said field effect sensor is molded to said mounting bracket.

14. A vehicle seat assembly as set forth in claim 9, wherein said field effect sensor comprises a logic device and a plurality of electrode pairs, said electrode pairs including an active pair and at least one inactive pair, wherein said active pair is the only electrode pair in communication with said logic device.

15. A vehicle seat assembly as set forth in claim 14, wherein said electrode pairs are aligned parallel to a longitudinal axis of said triggering rail.

16. A vehicle seat assembly as set forth in claim 9, wherein said seat cushion defines a middle and a side, and wherein said mounting rail defines a first side located adjacent said middle and a second side located adjacent said side, and wherein said field effect sensor is supported by said mounting rail on said first side.

* * * * *